United States Patent
Burris et al.

(10) Patent No.: US 11,954,719 B2
(45) Date of Patent: Apr. 9, 2024

(54) PERSONALIZED VOICE-BASED ASSISTANCE

(71) Applicant: NCR Voyix Corporation, Atlanta, GA (US)

(72) Inventors: Matthew Robert Burris, Atlanta, GA (US); Jodessiah Sumpter, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 930 days.

(21) Appl. No.: 16/426,973

(22) Filed: May 30, 2019

(65) Prior Publication Data
US 2020/0380579 A1    Dec. 3, 2020

(51) Int. Cl.
| | |
|---|---|
| *G06Q 30/00* | (2023.01) |
| *G06K 7/14* | (2006.01) |
| *G06Q 30/0601* | (2023.01) |
| *G10L 15/18* | (2013.01) |
| *G10L 15/22* | (2006.01) |
| *H04W 4/021* | (2018.01) |
| *G06V 40/16* | (2022.01) |
| *G10L 15/08* | (2006.01) |

(52) U.S. Cl.
CPC ....... *G06Q 30/0631* (2013.01); *G06K 7/1417* (2013.01); *G06Q 30/0641* (2013.01); *G10L 15/1815* (2013.01); *G10L 15/22* (2013.01); *H04W 4/021* (2013.01); *G06V 40/172* (2022.01); *G10L 2015/088* (2013.01); *G10L 2015/223* (2013.01)

(58) Field of Classification Search
CPC ............... G06Q 30/00; G06Q 30/0601; G06Q 30/0607; G06Q 30/0633; G06Q 30/0641
See application file for complete search history.

(56) References Cited

U.S. PATENT DOCUMENTS

| | | | | |
|---|---|---|---|---|
| 5,832,212 A | * | 11/1998 | Cragun | G06F 16/9535 714/37 |
| 6,336,099 B1 | * | 1/2002 | Barnett | G06Q 30/0271 705/14.35 |
| 7,310,601 B2 | * | 12/2007 | Nishizaki | G10L 15/32 704/E15.049 |

(Continued)

OTHER PUBLICATIONS

Paton, Elizabeth. "Imagining the retail store of the future." Accessed on May 22, 2017: 2017. (Year: 2017).*

(Continued)

*Primary Examiner* — Christopher B Seibert
(74) *Attorney, Agent, or Firm* — Schwegman Lundberg & Woessner, P.A.

(57) ABSTRACT

A consumer is identified engaged in an activity at a specific physical location. A context is formulated for the consumer based on the activity, the location, preferences associated with the consumer, and a history associated with the consumer. A natural language voice-based assistance session is initiated with the consumer. The session follows the consumer as the consumer travels and remains engaged in the activity. In an embodiment, the session is seamlessly maintained and is seamlessly transferred from a plurality of different devices as the consumer is engaged in the activity and travels. In an embodiment, the session is initiated without the consumer requesting the session.

6 Claims, 5 Drawing Sheets

(56) References Cited

U.S. PATENT DOCUMENTS

| | | | |
|---|---|---|---|
| 8,359,642 B1* | 1/2013 | Wurtenberger | H04N 21/23418 726/1 |
| 9,620,111 B1* | 4/2017 | Bell | G06Q 30/02 |
| 10,885,091 B1* | 1/2021 | Meng | G06F 16/24578 |
| 10,896,457 B2* | 1/2021 | Arnett | G06Q 30/0643 |
| 2002/0048350 A1* | 4/2002 | Phillips | G10L 15/06 704/E15.02 |
| 2004/0117384 A1* | 6/2004 | Ray | G06Q 20/04 |
| 2005/0043940 A1* | 2/2005 | Elder | G06F 16/24522 704/9 |
| 2005/0125301 A1* | 6/2005 | Muni | G06Q 30/06 705/23 |
| 2007/0256093 A1* | 11/2007 | Hiler | H04N 21/472 725/28 |
| 2008/0010170 A1* | 1/2008 | Chan | G06Q 10/087 705/28 |
| 2008/0155614 A1* | 6/2008 | Cooper | G06Q 30/0273 705/26.1 |
| 2009/0119190 A1* | 5/2009 | Realini | G06Q 20/3265 705/37 |
| 2009/0157472 A1* | 6/2009 | Burazin | G06Q 30/0259 705/14.57 |
| 2009/0240518 A1* | 9/2009 | Borom | G06Q 30/0601 705/14.1 |
| 2010/0011322 A1* | 1/2010 | Billmaier | H04N 21/4438 715/830 |
| 2011/0307280 A1* | 12/2011 | Mandelbaum | G06Q 10/025 705/6 |
| 2012/0006891 A1* | 1/2012 | Zhou | G06K 7/1095 235/380 |
| 2012/0078732 A1* | 3/2012 | Heller | G06Q 30/0241 705/40 |
| 2012/0185321 A1* | 7/2012 | Lal | G06Q 30/0227 705/14.28 |
| 2013/0024440 A1* | 1/2013 | Dimassimo | G06F 16/36 707/706 |
| 2013/0047115 A1* | 2/2013 | Migos | G06F 3/0484 715/776 |
| 2014/0067564 A1* | 3/2014 | Yuan | G06Q 30/0641 705/16 |
| 2014/0378204 A1* | 12/2014 | Michel | G07F 17/329 463/17 |
| 2015/0212710 A1* | 7/2015 | Gupta | G06Q 30/0641 715/765 |
| 2015/0235017 A1* | 8/2015 | Oberheide | G06F 21/44 726/6 |
| 2015/0294386 A1* | 10/2015 | Hertschuh | G06Q 30/0623 705/26.43 |
| 2016/0350836 A1* | 12/2016 | Burns | G06Q 30/0625 |
| 2017/0243107 A1* | 8/2017 | Jolley | G06N 5/02 |
| 2018/0005305 A1* | 1/2018 | Hirsch | G06Q 30/0625 |
| 2018/0217990 A1* | 8/2018 | Kumar | G06F 16/9535 |
| 2018/0232443 A1* | 8/2018 | Delgo | G06F 16/35 |
| 2019/0163437 A1* | 5/2019 | Nagasaka | G06Q 30/06 |

OTHER PUBLICATIONS

Nguyen, Anh Tuan, Tung Thanh Nguyen, and Tien N. Nguyen. "Lexical statistical machine translation for language migration." Proceedings of the 2013 9th Joint Meeting on Foundations of Software Engineering. 2013. (Year: 2013).*

* cited by examiner

PERSONALIZED VOICE-BASED ASSISTANCE

BACKGROUND

Technology is substantially integrated into businesses and the everyday life of consumers. Businesses have added technology support to transacting with their consumers over a variety of communication channels, some of which include consumer-operated devices.

Most consumer-based services are directed to performing a checkout or taking an order of the consumer. That is, the mobile applications are focused on either taking an order of the consumer or checking a consumer out with consumer purchased items. As a result, consumers have a wide variety of technology options when placing an order with an enterprise or checking out with purchased items from the enterprise.

A variety of generic voice-based assistants are also provided to consumers. Some of these, allow consumers to place orders and perform transaction checkouts. These assistants are not directed to any particular enterprise; as a result, the assistants are not specifically tailored to any specific enterprise where a consumer may be located.

Additionally, consumers have come to rely on their mobile phones to perform comparison-based shopping while the consumers are physically located within an enterprise. Some specific applications offer product price-based comparison shopping; however, consumers mostly rely on web-based searches for product price-based comparison shopping.

A variety of problems exists with the existing technology. For example, consumers do not like continuously removing their phones and manually performing web-based product searches or engaging an existing voice assistant as they may not have a free hand to access their phones or it may be inconvenient to access their phones; the web-based searches and the existing voice assistants do not provide enterprise-specific information (such as locations of products within a specific store, promotions available for products within the store, etc.); the web-based searches and the existing voice assistants are not contextually aware of the consumer's preferences and/or the consumer's current location within a given enterprise and do not use this contextual information when formulating answers to questions presented by the consumer; and the web-based searches and existing voice assistants may not have access to the consumer's previous transaction history that may be useful in formulating answers to consumer-presented questions.

SUMMARY

In various embodiments, methods and a system for personalized voice-based assistance are provided.

According to an embodiment, a method for personalized voice-based assistance is presented. A user is identified at a site and a context for the user and the site are formulated. The user is engaged in a natural language voice dialogue while the user remains on the site using the context.

DETAILED DESCRIPTION

Figure 1:
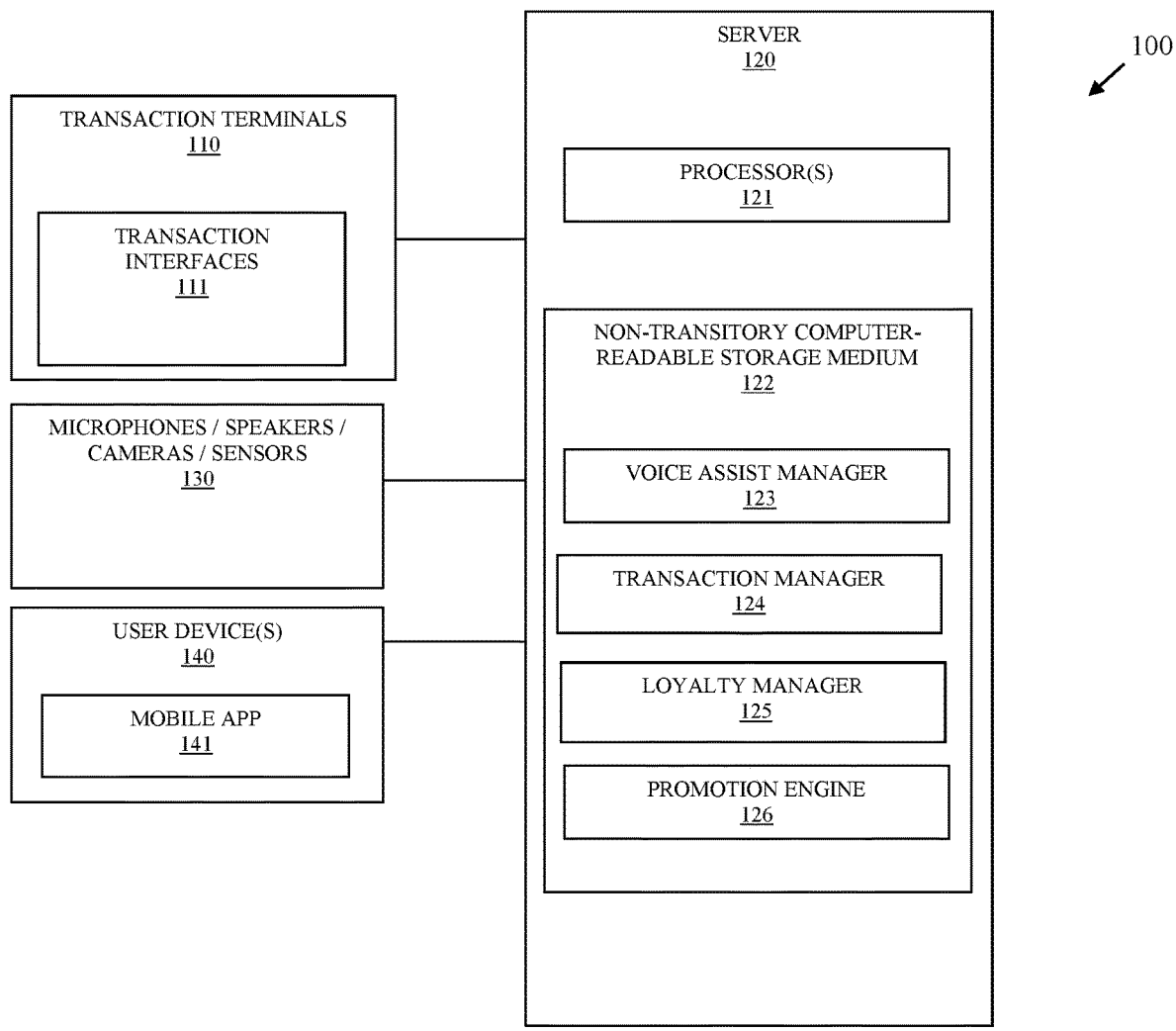
FIG. 1 is a diagram of a system for personalized voice-based assistance, according to an example embodiment.

FIG. 1 is a diagram of a system 100 for personalized voice-based assistance, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of personalized voice-based assistance, presented herein and below.

As used herein and below, the terms "user," "consumer," "user," and "customer" may be used interchangeably and synonymously. The terms refer to an individual that is located within a store or a site (including venue) that is providing services or goods for purchase by the individual.

System 100 includes a plurality of processing devices and device types 110-140. The system 100 includes transaction terminals 110, a server 120, microphones/speakers/cameras/sensors 130, and user operated devices 140. Server 120 includes executable instructions that execute on one or more hardware processors 121 of server 120 from a non-transitory computer-readable storage medium 122 as: a voice assistance manager 123, transaction manager 124, loyalty manager 125, and promotion engine 126.

It is to be noted that there may be multiple servers 120, such that the different elements 123-126 may execute on a same server 120 or multiple different servers 120 networked together. Furthermore, the server 120 may be a Local Area Network (LAN)-based server 120 or a Wide-Area Network (WAN)-based server 120.

In an embodiment, the server 120 is part of a cloud-processing environment that includes a plurality of servers logically cooperating of a network as a single accessible server 120.

The components of the system 120 permit customer-based personalized natural language voice assistance while the customer traveling and/or shopping within a store. The assistance can be provided to the customer in an unsolicited manner (i.e., the assistance is initiated by the voice assistance manager 122 without a request for assistance being made by the customer). The assistance may also be actively requested by the customer.

The assistance is provided as a natural-language voice session between the customer and the voice assistance manager 123 and the session can be initiated without any request being first made by the customer or the session can be initiated based on a request or a voice-based question made by the customer. The session is seamlessly maintained while the customer is engaged in an activity and may be transferred to a plurality of different devices as the customer travels and remains engaged in the activity.

When the session is initiated (either in an unsolicited manner or solicited manner), the session is configured with a context upon which voice-based assistance will be based during the session. The context can include a variety of information, such as and by way of example only: 1) preferences known for the customer (e.g., loyalty account (loyalty system, loyalty level, current loyalty points' balance, loyalty promotions available), preferred products, preferred payment methods, preferred brands of products, preferred price ranges for products, retailer account, email, phone number, home address, preferred distance to travel for a product for a current location of the customer, etc.), 2) current physical location of the customer including any store associated with the location and the location within that store (such as aisle, counter, department, entrance, exit, etc.), 3) current date including day of week and time of day, 4) a transaction history associated with the customer (including patterns for purchased items within the transaction history for a given product or set of products), and 5) preferred spoken language of the customer.

Initially, the customer is identified at a given store or a given location for which assistance is provided. Identification can occur in a variety of different manners such as and by way of example only: 1) the mobile application (app) 141 reports a location of device 140 to the voice assistance manager 123 and the location is mapped to a given store; 2) the customer operates device 140 to check-in to an assistance location using an integrated camera of device 140 to scan a barcode or Quick Response (QR) code located at an entrance of the store or situated on displays throughout the store, which causes app 141 to interact with assistance manager 123 and check-in the customer, using a Near-Field Communication (NFC) transceiver of device 140 the customer taps device 140 on an NFC-enabled device located at the entrance of the store or situated in various locations throughout the store (can be located at the transaction terminals 110 as well) which causes app 141 or the NFC device to report to the voice assistance manager 123, and/or using Bluetooth® or Bluetooth® Low Energy (BLE) app 141 detects a wireless signal emitted from a beacon within the store and reports to the voice assistance manager 123 for customer check-in; 3) the customer inserts a loyalty card into a terminal 110 or presents an identification card to a predefined camera 130 within the store, which causes the assistance manager 123 to identify the customer and check the customer into the store; 4) facial recognition of the customer from images captured by the cameras 140, which causes assistance manager 123 to check in the customer; 5) a voice phrase spoken by the customer and captured by a microphone 130 with voice recognition processing performed causing assistance manager 123 to check-in the customer to the store; 6) a wireless sensor 130 that detects and reads a card or token in possession of the customer, which causes the customer to be identified and the assistance manager 123 to check-in the customer; and/or 7) the customer enters a code at a terminal 110 through a keypad or touchscreen, which causes the customer to be identified and checked-in by the assistance manager 123.

Once the customer is checked-in by the assistance manager 123, the assistance manager 123 formulates the context for the customer. The assistance manager 123 uses the context to provide natural-language voice-based assistance to the customer while the customer is within the store. The assistance manager 123 also obtains and configures its processing based on information that is specific to the store, such as item catalogues, item pricing, clerks that are working at the store and their contact information (mobile device identifiers/numbers, names, etc.), item locations (aisle identifiers and shelf identifiers within each aisle), floorplan for the store and locations of points-of-interest within the store (restrooms, customer service desks, food court, departments, etc.), and the like. The specific store information also includes a lexicon of spoken words that are specific to the store (such as product names, brands, promotion names, etc.). The context and store specific information allow the assistance manager 123 to focus responses and assistance in manners that are personalized for the customer and specific to the store where the customer is checked in.

Throughout the store microphones, speakers, cameras, and/or sensors 130 are situated. The microphones 130 are monitored for audio associated with the customer. The speakers 130 are accessible and controlled by voice-based audio produced by the assistance manager 123. The cameras 130 produce images that are processed for identifying the customer and tracking the customer within the store. Sensors 130 may also track the customer by reading a card or token possessed by the customer. Still further, app 141 may be used to interact with sensors 130 to track positions of the customer within the store, the positions are continuously reported by app 141 to the assistance manager 123.

In an embodiment, the app 141 and the assistance manager 123 interact with one another to play voice-based guidance produced by the assistance manager 123 on integrated speakers of user device 140.

In an embodiment, the app 141 monitors an integrated microphone of user device 140 and reports spoken audio of the customer back to the assistance manager 123.

So, the store may or may not have microphones 130 and/or speakers 130 distributed throughout the store and in situations where such is lacking, the integrated microphone and speaker of user device 140 may be used to receiving voice input from the customer and providing voice output to the customer. It is also noted that microphones 130 and speakers 130 may be used in addition to using the integrated microphone and speaker of user device 140 for purposes of receiving voice input and providing voice output.

Images captured by cameras 130 may also be processed to determine a pose of the customer, such as hands on hips, hand on chin, hand running through hair, etc. Predefined poses that are matched to a current pose of the customer may be used as a trigger for the assistance manager 123 to initiate a voice-based assistance session with the customer utilizing speakers 130 and/or an integrated speaker of user device 140. Furthermore, the length of time that the customer remains in a single location may also be monitored and a threshold set such that if the customer remains in a same spot in front of a same shelf or aisle within the store beyond the threshold, the assistance manager 123 initiates unsolicited voice-based assistance utilizing speakers 130 and/or an integrated speaker of user device 140. In a similar manner, when the customer remains within a single aisle or repeatedly returns to a same aisle within a given period of time, the assistance manager 123 may initiated a voice assistance session with the customer through speakers 130 and/or an integrated speaker of user device 140.

Still further, microphones 130 and/or the integrated microphone of user device 140 are monitored for voice produced or provided by the customer while in the store. The user may specifically use a predefined spoken wake-up word to at any point initiate a voice-based assistance session with the assistance manager 123. Additionally, the voice of the user may be monitored for specific words and phrases that are associated with the user having questions and even through the user was not intentionally trying to initiate a natural language voice-based assistance session with the assistance manager 123, the assistance manager 123 can unilaterally decide to initiate the voice-based assistance session through providing spoken audio over speakers 130 and/or the integrated speaker of user device 140. The monitored speech of the user may be associated with the user talking to someone present in the store with the user or may be associated with the user simply talking to himself/herself while in the store.

In this way, the natural-language voice-based assistance session between the assistance manager 123 and the customer/user may be initiated by the customer or initiated by the assistance manager 123 based on monitored audio and/or monitored actions of inaction of the customer while in the store (as discussed above).

Once a voice-session is initiated, the assistance manager 123 converts speech-based audio to text (speech-to-text) and performs processing to formulate a response to the text by identifying an intention of the audio input and finding an answer to that intention. The answer is then converted from text into a spoken sentence or phrase (text-to-speech) and is provided to a speaker 130 located in proximity to the current position of the customer within the store (based on customer tracking as discussed above) and/or provided to a speaker integrated into user device 140.

The speech-based assistance from the assistance manager 123 can include anything relevant to the context, such as and by way of example only providing directions within the store from the customer's current location to another store location where a customer-desired product is located, current pricing information for products, current promotions of specific products or available within the store on all products, etc.

During the speech session, the assistance manager 123 can perform a variety of actions, such as and by way of example only sending navigation instructions to app 141 for navigating the customer to a specific in-store location, utilizing transaction manager 124 to order an out-of-stock product on behalf of the customer for delivery to the customer's home or available for pickup at a later time within the store, providing a promotion for redemption by the customer while within the store through interaction with promotion engine 126 and/or loyalty manager 125, utilizing a web-based transaction service of a retailer not associated with the store to order a product on behalf of the customer for subsequent delivery to the customer's home address, dispatching a clerk within the store to the customer's current location, sending a product instructional video or product informational video to a digital display in proximity to the customer for playing and/or sending the video to app 141 for playing on user device 140, sending product information to the digital display and/or app 141, adding a product to a shopping list or wish list maintained in the preferences for the customer, removing a product from an existing shopping list or wish list of the customer, searching the web for information requested by the customer and providing through audio and or a link sent to device 140, establishing a video-based or voice call between the customer and a clerk (located within the store or located remotely) where the call can be initiated using device 140 and/or using a microphone 130 and/or a digital sign in proximity to the customer's current location/position within the store, etc.

In fact, the assistance manager 123 can be configured to perform a variety of customized actions on behalf of the customer during the voice-based session. Some of these may be defined by the customer in the customer preferences such as posting to a social media account of the customer when requested to do so by the customer during the session. The retailer/store may also define actions that the assistance manager 123 can take during a session, such as tracking specific out-of-store sales that the assistance manager 123 performs for a customer within the store for purposes of collecting in-store commissions by the store from the external retailer (a different retailer that is not the retailer associated with the store).

During the session, the customer is tracked as the customer moves or travels about the store and the customer is continuously monitored to detect whether the customer needs assistance for unsolicited assistance or for customer-directed assistance. The session then follows the customer through the customer's journey within the store and may involve multiple devices throughout the store, such as multiple digital signs, multiple transaction terminals 110 utilizing transaction interfaces 111, multiple different microphones and speakers 130, etc.

In an embodiment, the assistance session may also be transcribed into text and sent to clerk-operated mobile devices while the customer is still shopping within the store. In this way, the clerk can be up-to-speed on what the customer needs or is seeking should the clerk need to engage the customer within the store.

In an embodiment, the assistance session may be transcribed into text and sent as a text or email to the customer when the session ends, upon request of the customer.

In an embodiment, the assistance manager 123 includes a trained machine-learning algorithm that is continuously learning and improving its spoken capabilities and accuracy.

In an embodiment, the transaction terminals 110 include Point-of-Sale (POS) cashier-assisted terminals, Self-Service Terminals (SSTs), Automated Teller Machines (ATMs), kiosks, and/or digital signs.

In an embodiment, the user devices 140 include phones, laptops, wearable processing devices, and/or tablets.

There are several variations on how the system 100 can operate, some of which are discussed above and some of which are more completely discussed below with the other FIGS. 2-5.

Figure 2:
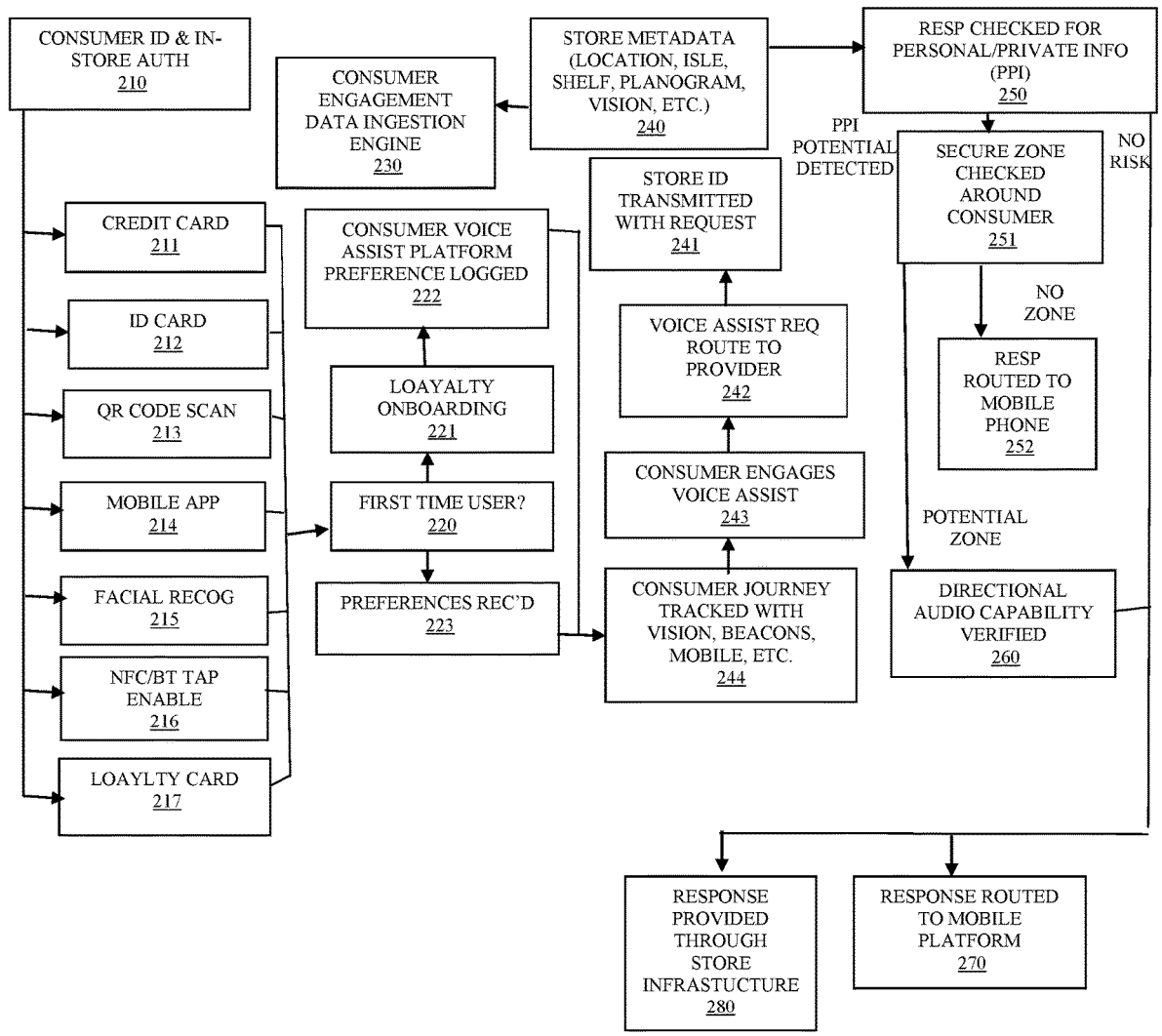
FIG. 2 is a diagram of processing associated with personalized voice-based assistance, according to an example embodiment.

FIG. 2 is a diagram of processing associated with personalized voice-based assistance of system 100, according to an example embodiment.

At 210, the transaction manager 124 interacts with the assistance manager 123, terminals 110, and/or user device 140 to identify a customer, to check the customer into a store, and/or to authenticate an identity of the customer.

As stated above with the FIG. 1, this can occur in a variety of manners. For example, at 211, a credit card can be inserted into a card reader of terminal 110 and read with customer account information or the credit card may be read wirelessly by a contactless card reader of terminal 110. At 212, an identification card 212 is presented to a camera 130 by the customer. The camera 140 can be integrated into terminal 110 or provided at a location for check-in that is separate from a location within the store where the terminal 110 is located. The camera may also be integrated into device 140, such that the customer initiates app 141 and utilized the integrated camera of device 140 to take a picture of the customer's identification card. At 213, the device 140 is operated by the customer to scan a QR code. At 214, the app 141 utilizing and reporting location information for device 140 is used to check-in the customer. At 215, cameras 130 and/or an integrated camera of user device 140 is used to capture an image of the customer's face for purposes of performing facial recognition on registered facial features of the customer and checking the customer into the store. At 216, the app 141 combined with wireless transceivers and/or beacons are used to read a token and/or card in possession of the customer for check-in. At 217, a loyalty card is read, imaged, or information is entered into a touchscreen display for the loyalty card are used for checking-in the customer to the store.

Check-in may or may not entail authentication of an identity of the user; that is, the user is identified and associated with a known customer identity but whether or not additional authentication is performed is optional. Such additional authentication can be defined by the user in preferences, such that the user can control the level of security needed. The store may also require authentication. The degree and type of authentication are configurable.

At 220, a determination is made as to whether the customer was actually associated with a known customer identity associated with the store/retailer. Assuming that the customer is unregistered, the customer is engaged in a voice session with the assistance manager 123 to process loyalty onboarding, at 221. That is, the customer is signed up for a loyalty account with the store/retailer at 221 through the initial voice session and at 222 the customer initial desired preferences are set or logged.

Assuming, the customer is registered with a loyalty account, at 223, the known preferences of the customer for that loyalty account are received or acquired.

At 230, the assistance manager 123 obtains and generates a context for the customer (as was discussed above); this includes ingesting data necessary in formulating the context with the store specific information (at 240). Any personal and private information security settings desired by the customer is noted at 250.

At 244, the customer journey (movements) about the store are tracked utilizing microphones 130, cameras 130, sensors 130 (including wireless beacons as discussed above), and/or the app 141.

At 243, the assistance manager 123 determines to initiate and engage the customer in a voice assistance session (natural language dialogue). Again, this can be initiated by the assistance manager 123 without any affirmative request for assistance being made by the customer or can be initiated by the customer through voice request.

At 242, the assistance manager 123 routes any request made by the customer during the session to an appropriate provider. That is, if the session required access to external information or services, a text-based version of the request is sent to the appropriate provider that is needed. At 241, the store identifier for the store is sent with the request to the provider, so that the provider knows the store to which the request was initiated. This situation may be during the session the customer is purchasing or ordering a product that is not provided or available within the store, this allows for the store providing the assistance manager 123 to receive an appropriate commission from the sale that the assistance manager 123 facilitated between the customer and the provider while within the store.

Any privacy or security settings set by the customer within the preferences are then enforced during the session. For example, at 251 a check is made that the area around the customer during the session is secure or poses no risk. This may entail utilizing the cameras 130 and/or the microphones 130 to determine if others are in proximity to the customer during the session (through images of background audio). In such situations, to preserve private information the session can be routed directly to the user device 140 utilizing the app 141, at 252. If the area around the customer is determined to be potentially secure, at 260, the assistance manager 123 verifies that there is directional audio capability, at 260, for purposes of focusing audio input from the user to a specific microphone 130 and providing audio to a specific speaker 130.

When there is no risk of exposing personal information of the customer during the session or once the session is routed to the user device 140 or is using directional audio, a response from the assistance manger 123 during the session is directed to the user device, at 270, and/or the store-based speakers 130, at 280.

Again, during the session the assistance manager 123 can perform a variety of actions on behalf of the customer and the store/retailer (as discussed above). Moreover, responses are provided from the assistance manager 123 in spoken natural language speech either through an integrated speaker of the user device 140 and/or through speakers 130 (which may be free standing and/or integrated into terminals 110 within the store).

Furthermore, in some cases the speech input (questions and/or commands) received from the customer during the session may be received through a microphone 130 and/or an integrated microphone of user device 140 and then switched dynamically to a different microphone 130 during the session. This can occur with the speakers 140 and/or integrated speaker of user device 140 as well. In this way, the customer is permitted to move about the store with the session following the user. Changes to different microphones and different speakers may also be mandated by the assistance manager 123 based on security being enforced as discussed above. So, the customer may request information during the session that necessitates that the assistance manager 123 send via an integrated speaker of the user device 140 to preserve privacy of the user. It may also be that the response provided during the session necessitates that it be sent as text in a text message to user device 140, such that in some cases responses are text-based for security reasons. The speech output may indicate to the user that the user's requested information was sent as a text message to the user. This may occur with the user is requesting credit card details, password details, etc. from the assistance manager during the session, such that the security settings dictate that such information not be provided via speech output from the assistance manager 123.

These and other embodiments are now discussed with reference to the FIGS. 3-4.

Figure 3:
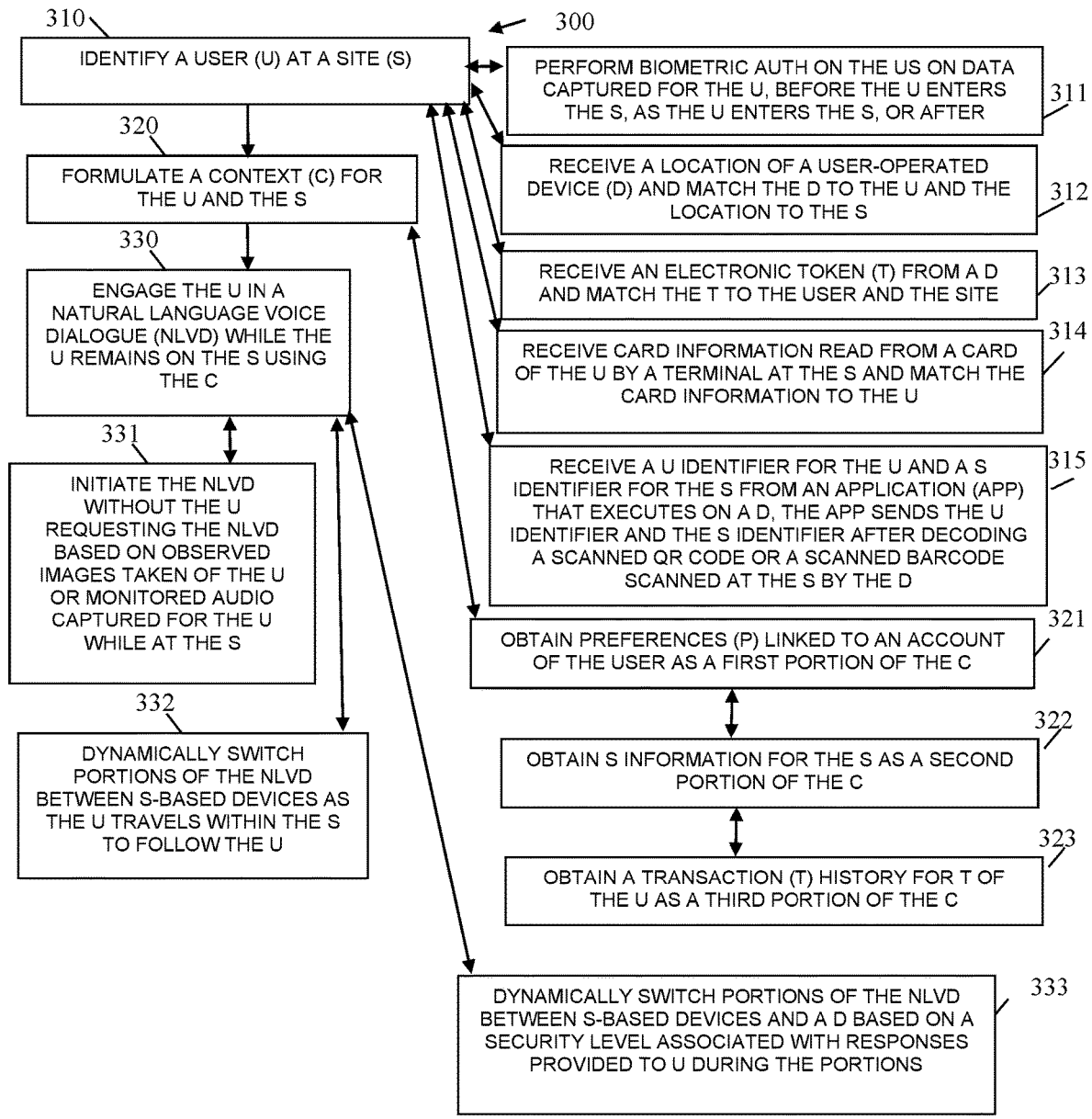
FIG. 3 is a diagram of a method for personalized voice-based assistance, according to an example embodiment.

FIG. 3 is a diagram of a method 300 for personalized voice-based assistance, according to an example embodiment. The software module(s) that implements the method 300 is referred to as an "voice assistant." The voice assistant is implemented as executable instructions programmed and residing within memory and/or a non-transitory computer-readable (processor-readable) storage medium and executed by one or more processors of a device. The processor(s) of the device that executes the voice assistant are specifically configured and programmed to process the voice assistant. The voice assistant may have access to one or more network connections during its processing. The network connections can be wired, wireless, or a combination of wired and wireless.

In an embodiment, the device that executes the voice assistant is the server 120. In an embodiment, the server 120 is a cloud-based processing environment comprising a collection of physical servers cooperating as a single logical server. In an embodiment, the server 120 is a Local-Area Network (LAN)-based server or a Wide-Area Network (WAN)-based server.

In an embodiment, the voice assistant is all or some combination of the voice assistance manager 123, the transaction manager 124, the loyalty manager 125, and/or the promotion engine 126.

At 310, the voice assistant identifies a user at a site. The site can be a store or a venue. Moreover, the site can be exclusively indoors, exclusively outdoors, or both indoors and outdoors. The site includes a plurality of networked based microphones, speakers, and/or cameras. In an embodiment, the microphone, cameras, and/or speakers are both network-based and integrated into terminals or digital signs at the site.

In an embodiment, at 311, the voice assistant performs biometric authentication on the user before the user enters the site, as the user enters the site (at an ingress point of entry to the site), or sometime after the user is already within the site. In an embodiment, the biometric authentication is facial recognition performed on an image of a face of the user that this captured from one of the cameras 130 when the user enters the site.

In an embodiment, at 312, the voice assistant receives a location of a user-operated device 140 and matches a device identifier for the user-operated device 140 to the user and the location is matched to the site.

In an embodiment, at 313, the voice assistant receives an electronic token from a user-operated device 140 and matches the electronic token to the user and the site. In an embodiment, the token is an NFC-based token or a BLE token.

In an embodiment, at 314, the voice assistant receives card information read from a card of the user by a terminal at the site and matches the card information to the user. In an embodiment, the card is read by a contactless card reader of the terminal. In an embodiment, the card is read from a contact-based card reader that is swiped through or inserted into the card reader. In an embodiment, the card is read from an image taken of the card by a camera integrated into the terminal.

In an embodiment, at 315, the voice assistant receives a user identifier for the user and a site identifier for the site from a mobile app 141 that executes on a user-operated device 140. The app 141 sends the user identifier and the site identifier after decoding a scanned QR code or scanned barcode that is scanned by an integrated camera of the user-operated device 140.

At 320, the voice assistant formulates or aggregates information to construct a context for the user and the site.

In an embodiment, at 321, the voice assistant obtains preferences linked to an account of the user as a first portion of the context. The preferences can be any of the above-noted preferences discussed with the FIGS. 1 and 2.

In an embodiment of 321 and at 322, the voice assistant obtains site information for the site as a second portion of the context. The site information can be any of the above-noted site information discussed with the FIGS. 1 and 2.

In an embodiment of 322 and at 323, the voice assistant obtains a transaction history for transactions of the user as a third portion of the context. The transactions can be associated with the user account with the enterprise associated with the site and associated with other transactions associated with other user accounts with other enterprises not associated with the site. In this way, the transaction history may be federated across multiple different enterprises that the user has performed transactions with.

At 330, the voice assistant engages the user in a natural language voice dialogue while the user remains on the site using the context, which was formulated at 320.

In an embodiment, at 331, the voice assistant initiates the natural language voice dialogue without the user requesting (unsolicited) the natural language voice dialogue based on observed images taken of the user by cameras 130 or monitored audio captured for the user by microphones 130 while the user is at the site.

In an embodiment, at 332, the voice assistant dynamically switches portions of the natural language voice dialogue between site-based devices as the user travels or moves within the site to follow the user.

In an embodiment, at 333, the voice assistant dynamically switches portions of the natural language voice dialogue between site-based devices and a user-operated device 140 based on a security level associated with responses being provided to the user during the natural language voice dialogue.

Figure 4:
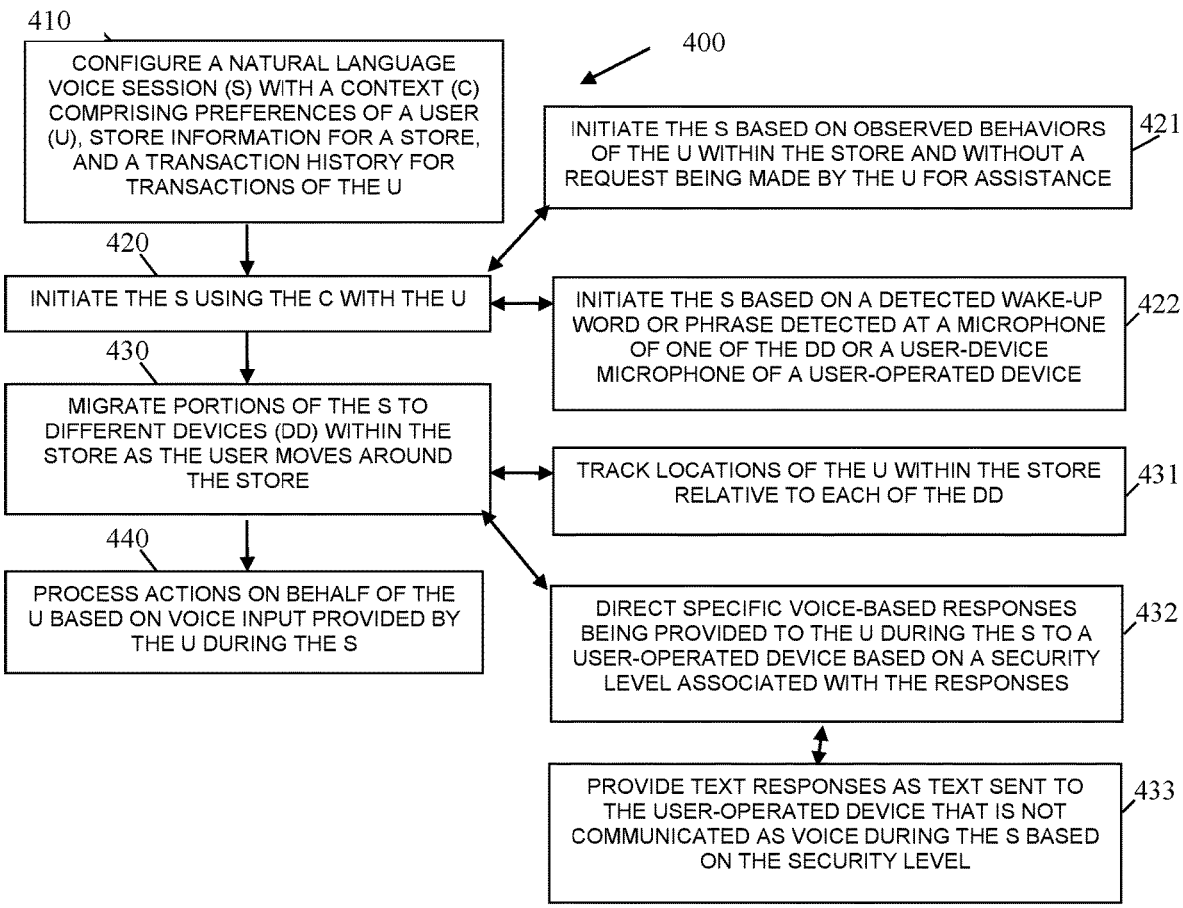
FIG. 4 is a diagram of another method for personalized voice-based assistance, according to an example embodiment.

FIG. 4 is a diagram of another method 400 for personalized voice-based assistance according to an example embodiment. The software module(s) that implements the method 400 is referred to as a "speech-based assistance manager." The speech-based assistance manager is implemented as executable instructions programmed and residing within memory and/or a non-transitory computer-readable (processor-readable) storage medium and executed by one or more processors of a device. The processors that execute the speech-based assistance manager are specifically configured and programmed to process the speech-based assistance manager. The speech-based assistance manager may have access to one or more network connections during its processing. The network connections can be wired, wireless, or a combination of wired and wireless.

In an embodiment, the device that execute the speech-based assistance manager is the server 120. In an embodiment, the server 120 is a cloud processing environment, a LAN server, or a WAN server.

In an embodiment, the speech-based assistance manager is all of or some combination of: assistance manager 123, transaction manager 124, loyalty manager 125, and/or promotion engine 126.

The speech-based assistance manager presents another and, in some ways, enhanced processing perspective of the method 200.

At 410, the speech-based assistance manager configures a natural language voice session with a context that comprises preferences for a user, store information for a store, and a transaction history for previous transactions of the user.

At 420, the speech-based assistance manager initiates the natural language voice session with the user within the store.

In an embodiment, at 421, the speech-based assistance manager initiates the natural language voice session based on observed behaviors of the user within the store and without a request being made by the user for assistance (unsolicited initiation).

In an embodiment, at 422, the speech-based assistance manager initiates the natural language voice session based on a detected wake-up word or phrase detected at a microphone of one of the different devices (see 430 below) or a user-operated device microphone of a user-operated device 140.

At 430, the speech-based assistance manager migrates portions of the natural language voice session to different devices within the store as the user moves around the store.

In an embodiment, at 431, the speech-based assistance manager tracks locations of the user within the store relative to each of the different devices. The speech-based assistance manager interacts with a specific different device that is in closest proximity to the user.

In an embodiment, at 432, the speech-based assistance manager directs specific voice-based responses being provided to the user during the natural language voice session to a user-operated device based on a security level associated with the responses.

In an embodiment of 432 and at 433, the speech-based assistance manager provides text responses as text sent to the user-operated device 140. The text associated with the text responses is not communicated as voice during the natural language voice session based on the security level.

At 440, the speech-based assistance manager processes actions on behalf of the user based on voice input provided by the user during the natural language voice session. The actions are configurable by the store and the user and may entail transaction processing with a different retailer from the retailer that is associated with the store (as discussed above).

Figure 5:
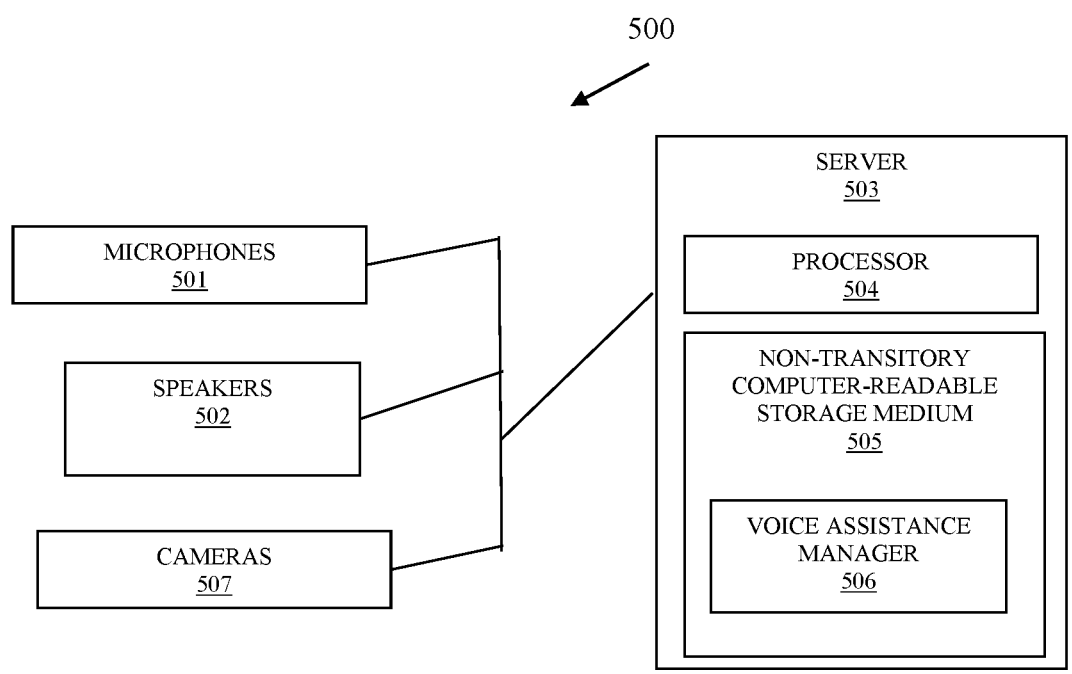
FIG. 5 is a diagram of another system for personalized voice-based assistance, according to an example embodiment.

FIG. 5 is a diagram of a system 500 for personalized voice-based assistance, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

The system 500 includes: microphones 501, speakers 502, a server 503 having a processor 504 and non-transitory computer-readable storage media 505 having executable instructions representing a voice assistance manager 506. Optionally, the system 500 includes cameras 507.

The voice assistance manager 506 when executed by the processor 504 from the non-transitory computer-readable storage medium 505 causes the processor 504 to: 1) check a customer into a store; 2) obtain preferences from an account of the customer with the store; 3) obtain store-based information including: item identifiers for items of the store, item location information for each item, item pricing information for each item, item description information for each item, store layout information, and promotion information for the store; 4) formulate a context from the preferences and the store-based information; 5) configure a natural language voice dialogue using the preferences and the store-based information; 6) track locations of the customer within the store; 7) initiate the natural language voice dialogue with the customer using the context; 8) migrate portions of the natural language voice dialogue to specific ones of the microphones 501 and specific ones of the speakers 502 based on the locations of the customer within the store; and 9) process actions as directed by the customer through voice inputs during the natural language voice dialogue.

In an embodiment, the voice assistance manager 506 when executed by the processor 504 from the non-transitory computer-readable storage medium 503 is further configured to cause the processor 504 to migrate other portions of the natural language voice dialogue to a customer-operated device of the customer based on security associated with voice responses being provided to the customer during the natural language voice dialogue.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

providing executable instructions from a non-transitory computer-readable storage medium to a processor of a server causing the processor to perform operations comprising:

configuring a natural language voice session with a context comprising 1) preferences of a user, 2) a current location of the user within a store relative to an aisle within the store, a counter within the store, a department within the store, and entrance of the store, or an exit of the sore, 3) store information for the store, 4) a preferred spoken language of the user, and 5) a transaction history for transactions of the user, wherein the preferences comprise a loyalty account of the user, a current loyalty points balance, loyalty promotions available, user preferred products, user preferred payment methods, preferred brands of products, preferred price ranges for the products, user email, user phone number, user home address, and user preferred distance to travel for a given product relative to the current location of the user;

initiating the natural language voice session using the context with the user through distributed microphones distributed throughout the store and through a microphone of a user-operated device;

tracking the user via images captured by cameras throughout the store as the user moves within the store from the current location to other locations of the store, wherein tracking further includes tracking the user through sensors located through the store using a mobile application of the mobile device of the user;

migrating portions of the natural language voice session to different devices within the store as the user moves around the store based on the tracking, wherein migrating further includes migrating a specific portion of the natural language voice session to a text message sent to the user-operated device based on security associated with the specific portion, wherein the specific portion migrated from a store device to the user-operated device based on the security, and communicating through the natural language voice session migration of the specific portion to the text message through speech output to the user during the natural-language voice session, wherein security settings dictate that the specific portion associated with card details or passwords be communicated via the text message, and wherein the speech output informs the user that the security dictated that the specific portion be sent via text message to the user; and processing actions on behalf of the user based on voice input provided by the user during the natural language voice session.

2. The method of claim 1, wherein initiating further includes initiating the natural language voice session based on observed behaviors of the user within the store and without a request being made by the user for assistance.

3. The method of claim 1, wherein initiating further includes initiating the natural language voice session based on a detected wake-up word or phrase detected at a microphone of one of the different devices or a user-device microphone of a user-operated device.

4. The method of claim 1, wherein tracking further includes tracking the other locations of the user within the store relative to each of the different devices.

5. The method of claim 1, wherein migrating further includes directing specific voice-based responses being provided to the user during the natural language voice session to a user-operated device based on a security level associated with the responses.

6. The method of claim 5, wherein directing further includes providing text responses as text sent to the user-operated device that is not communicated as voice during the natural language voice session based on the security level.

* * * * *